United States Patent [19]
Vogl

[11] 4,102,652
[45] Jul. 25, 1978

[54] MODULAR CONSTRUCTION FOR A LARGE CATALYTIC REACTION APPARATUS

[75] Inventor: Rudolf Vogl, Deggendorf, Donau, Germany

[73] Assignee: Deggendorfer Werft und Eisenbau GmbH, Deggendorf, Donau, Germany

[21] Appl. No.: 773,161

[22] Filed: Mar. 1, 1977

[51] Int. Cl.² .......................... B01J 8/06; B21D 53/06; B23P 15/26
[52] U.S. Cl. .................................... 23/288 M; 23/289; 29/157.4; 29/407; 29/469
[58] Field of Search ................ 23/288 M, 288 L, 289; 29/157.4, 407, 469

[56] References Cited

U.S. PATENT DOCUMENTS

| 1,598,062 | 8/1926 | Dienner et al. | 29/157.4 X |
| 3,153,845 | 10/1964 | Loomis | 29/407 X |
| 3,274,745 | 9/1966 | McManus et al. | 29/469 X |
| 3,587,732 | 6/1971 | Burne | 29/157.4 X |
| 3,601,878 | 8/1971 | Karmazin | 29/469 X |
| 3,644,976 | 2/1972 | Roberts, Jr. | 29/469 X |
| 3,751,783 | 8/1973 | Roberts, Jr. et al. | 29/469 X |

FOREIGN PATENT DOCUMENTS 1,149,436  4/1969  United Kingdom ............. 23/288 M Primary Examiner—Joseph Scovronek
Attorney, Agent, or Firm—Toren, McGeady and Stanger

[57] ABSTRACT

In large catalytic reaction apparatus where a fluid is catalytically treated as it flows through tubes, the apparatus is divided into a number of modular units which are assembled at a production location, shipped to a construction site and joined together to form the apparatus at the construction site. Each modular unit has a similar shape and has a sector-like shape in section extending transversely of the axial direction of the tubes. Each modular unit includes a plurality of tubes extending between a pair of sector-like shaped tube sheet sections with side walls laterally enclosing the tubes and forming, in combination with the tube sheet sections, a sealed modular unit which is capable of being tested at the production location before being shipped to the construction site.

7 Claims, 10 Drawing Figures

MODULAR CONSTRUCTION FOR A LARGE CATALYTIC REACTION APPARATUS

SUMMARY OF THE INVENTION

The present invention is directed to large catalytic reaction apparatus and, more particularly, it concerns the division of such apparatus into a plurality of modular units.

A bundle of tubes extending between tube sheets is frequently used in catalytic reaction apparatus. Generally, the catalyst is located within the tubes through which a gas to be treated is passed, while heat released in the treatment process is transferred to a heat exchange medium flowing over the outside of the tubes. There are a number of different designs of such catalytic reaction apparatus, for example, note German Pat. Nos. 1,064,922, 1,642,996, 2,062,095, and 2,230,127.

For reasons of economy a maximum number of tubes is preferred in such apparatus. There have been limits, however, placed on the use of a maximum number of tubes because of the considerable difficulties and high costs of transporting and assembling reaction apparatus of unusually great size and weight. To resolve the problem, the present invention proposes the use of a reaction vessel having a circular or polygonal outer circumference and a number of sector-shaped modular units which are produced and transported individually and assembled into the completed apparatus only at a construction site.

An important feature of the invention is the ability to test the individual modular units at the production location to determine that the tubes are effectively sealed into the tube sheets and that a seal-tight enclosure is provided laterally about the tubes and secured to the tube sheets for assuring that the unit is effectively sealed at operating pressure.

Other features of the invention include the interconnection of the individual modular units by radially extending welds between adjacent tube sheet sections and by longitudinal welds between adjacent edges of the side walls laterally enclosing the tubes. Preferably, the tube sheet sections are connected together along their radially inner and outer edges by butt welds with the region between such welds being interconnected by welded sheet metal strips.

In accordance with the present invention, each of the modular units is bounded at the opposite ends of the tubes by tube sheet sections, in the circumferential direction by inner and outer side walls and in the radial direction by planar side walls. The inner and outer side walls may have either an arcuate or a rectilinear shape providing either a cylindrical or a polygonal inner and outer surface. Distance members are provided between the adjacent surfaces of the radially extending planar side plates of each modular unit. During operation, these distance members afford mutual support for the modular units. Furthermore, the lower end of each modular unit is supported along its outer circumference on two adjustable supports and along its inner circumference on a common center support. The common center support is secured to the inner circumference of the lower tube sheet sections while the adjustable outer supports are connected to the circumferentially extending outer side walls.

Finally, the power consumption required for circulating the heat transfer medium flowing over the tubes, which depends on the pressure loss occurring in the course of the flow path, can be kept relatively low despite a great number of tubes, if the diameter ratio between the radially inner and outer surfaces of each modular unit does not exceed 5:1.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
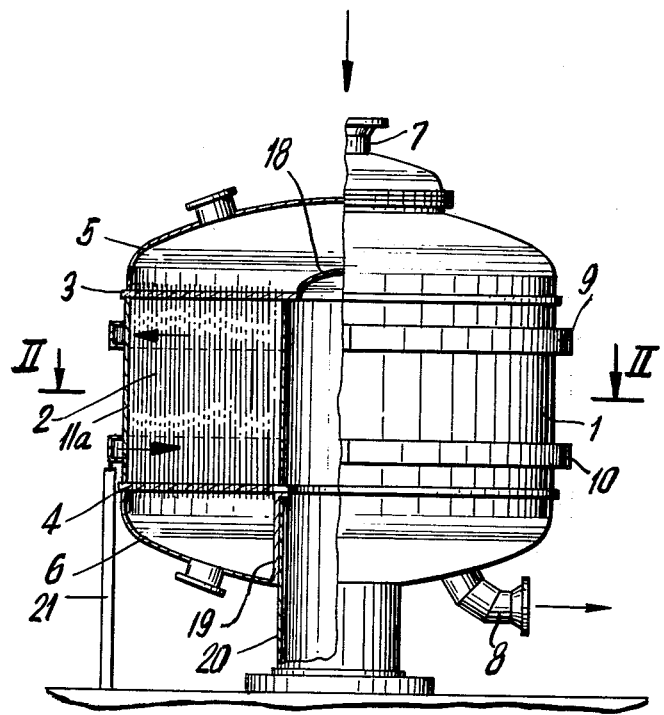
FIG. 1 is a side elevational view, shown partly in section of a reaction apparatus embodying the present invention.

As illustrated in FIG. 1 the completely assembled reaction apparatus does not differ from known designs. A casing 1 laterally encloses and extends in the same direction as tubes 2 which extend between a pair of vertically spaced tube sheets 3, 4. An upper hood 5 cooperates with the upper tube sheet 3 and a lower hood 6 cooperates with the lower tube sheet 4 for providing inlet and outlet chambers to the tubes. An inlet pipe connection 7 is provided in the upper hood 5 for supplying reaction gases and an outlet pipe connection 8 is provided in the lower hood 6 for discharging the gases. Between the upper and lower tube sheets, the casing 1 is laterally enclosed by conduits 9, 10, one of which supplies a circulating heat transfer medium for flow outside the tubes while the other removes the medium after it has completed its flow path for directing it to a heat exchanger, not shown, for recooling in exothermic processes and for reheating in endothermic processes.

Figure 2:
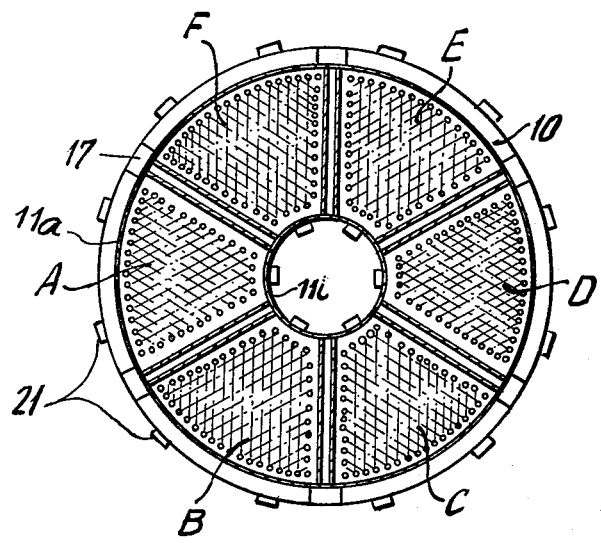
FIG. 2 is a transverse cross-sectional view taken along the line II — II in FIG. 1.
Figure 3:
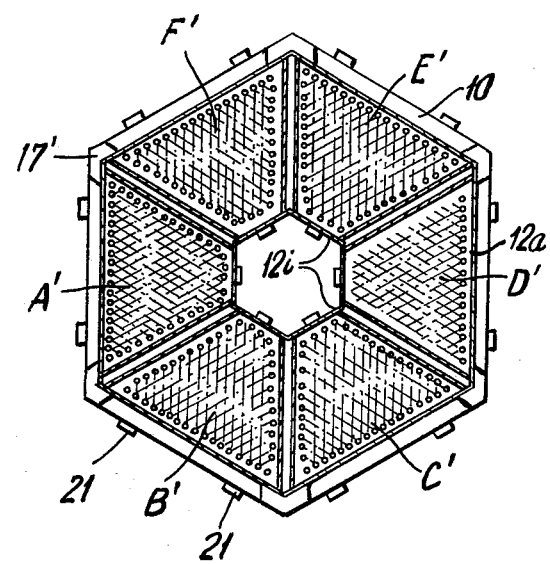
FIG. 3 is a transverse cross-sectional view similar to that shown in FIG. 2, however, of an apparatus having a polygonal outer circumference.
Figure 7:
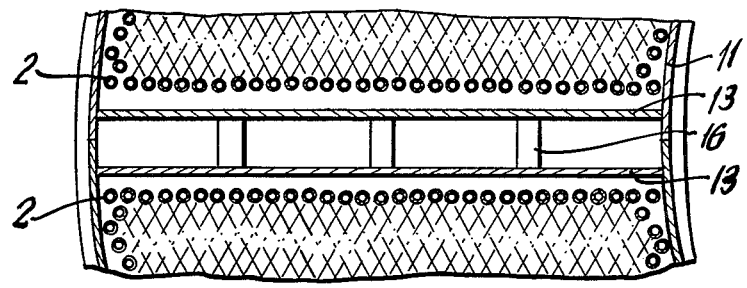
Figure 9:
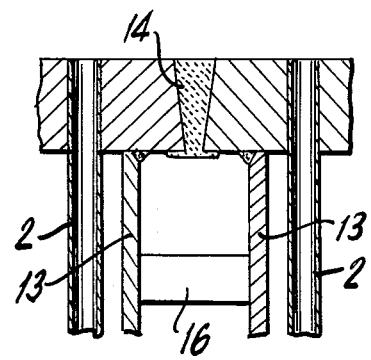
Figure 10:
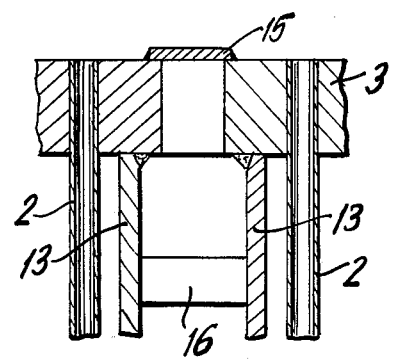

To construct a reaction apparatus in accordance with the present invention, so that it can be shipped and assembled at a construction site, the reaction vessel as shown in FIG. 2 consists of six sector-shaped modular units A – F having a circular outer circumference or as shown in FIG. 3 of six sector-shaped modular units A' – F' having a polygonal outer circumference. The outer shell of the apparatus is made up of a number of circular arcs or sections 11a as in FIG. 2 or planar sections 12a as shown in FIG. 3. The tubes 2 are disposed in a lattice-like arrangement between the outer side walls 11a, 12a and the inner side walls 11i, 12i, which have a circular arcuate section as shown in FIG. 2 or a planar section as shown in FIG. 3. In the radial direction each modular unit is bounded by planar side walls 13, note FIGS. 7, 9 and 10. The individual sections of the conduits 9, 10 secured to the outer surfaces of the outer side walls of each modular unit are either arcuately shaped or planar shaped in accordance with the outer circumferential configuration of the modular unit to which they are attached.

The individual sector-shaped sections of the tube sheets 3, 4 form the upper and lower end faces of the sector-shaped modular units. The sector-shaped tube sheet sections project slightly outwardly and slightly inwardly relative to the circumferentially extending side walls of the individual modular units and this feature can best be noted in FIGS. 4 and 5 at points 3a and 3i for the upper tube sheet sections and points 4a and 4i for the lower tube sheet sections. In addition, the tube sheet sections also project slightly outwardly beyond the radially extending side walls 13 of each modular unit, note FIGS. 9 and 10.

Figure 8:
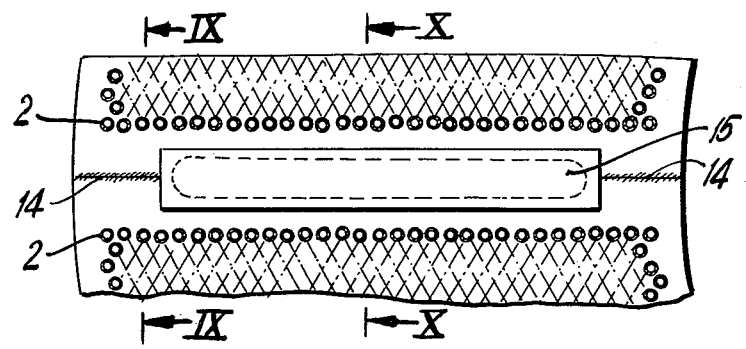

As can be seen in FIG. 8, the adjacent edges of adjoining tube sheet sections contact each other for a part of their radially extending dimension from the radially inner edge and the radially outer edge of the joint between them. Welds 14 secure these contacting radially extending edges together. Between the portions of the radially extending edges joined by the welds 14, the edges are spaced apart and the opening between them is bridged by a cover plate 15 which is welded to the adjoining tube sheet sections. Between the upper and lower tube sheet sections 3, 4, distance members 16 extend between the adjacent surfaces of the radially extending side walls 13 of the individual modular units. These distance members 16 bridge the space between the adjacent surfaces and support the radially extending side walls against the internal operating pressure within the modular units, note FIGS. 7, 9 and 10.

The circumferentially extending sections of the conduits 9, 10 are interconnected during the assembly of the modular units A – F and A' – F', respectively, by fitting members 17, 17'.

Figure 4:
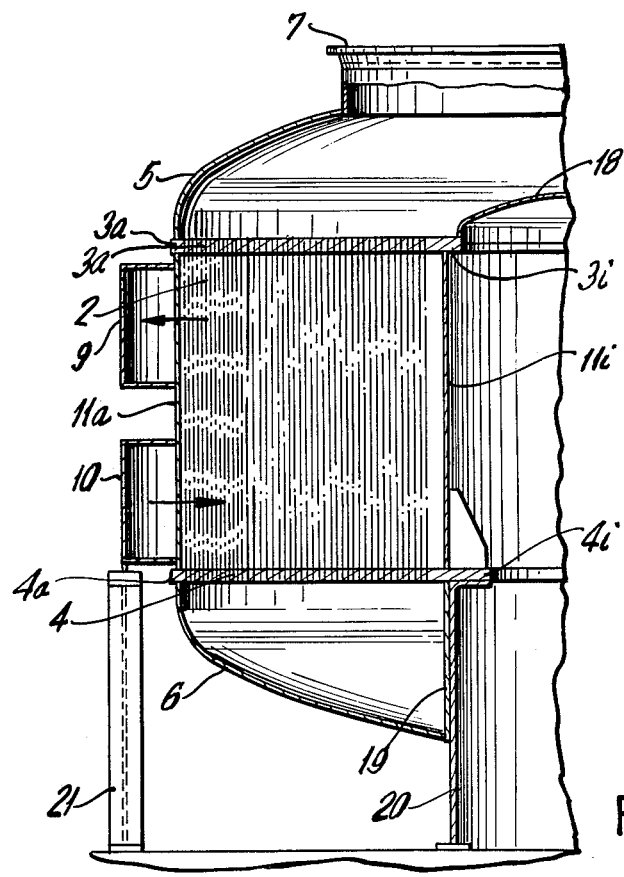
FIG. 4 is a partial vertical sectional view of the apparatus in a somewhat enlarged representation.
Figure 5:
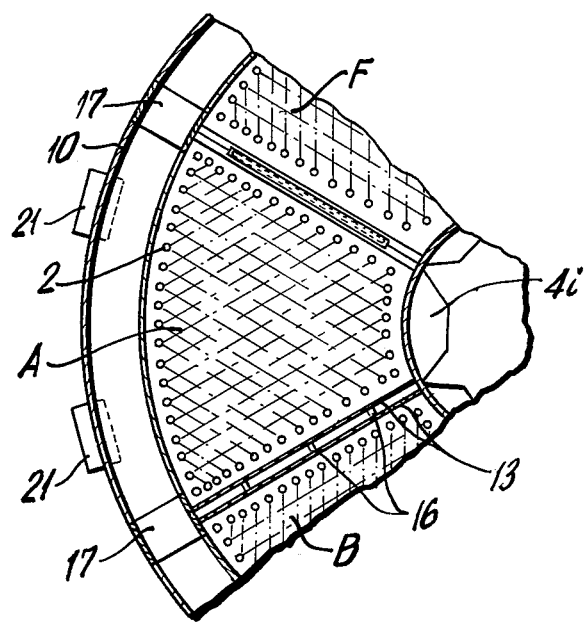
FIG. 5 is an enlarged transverse cross-sectional view of the apparatus.
Figure 6:
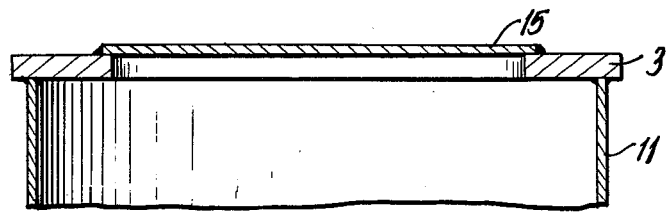
FIGS. 6 – 10 are detail sectional views of various parts of the apparatus.

While the individual modular units have been characterized as being sector-shaped it can be appreciated, especially from viewing FIGS. 2 and 3, that the radially inner portions of the units are cut off so that the radially extending side walls of each unit do not meet at the axial center of the casing 1 whether it is circular as shown in FIG. 2 or polygonal as shown in FIG. 3. With the radially inner portions of the tube sheet sections cut off there is a central region provided in the apparatus which does not contain tubes, that is the portion radially inward of the radially inner side walls of the modular units. This axially extending central region is sealed from the inlet plenum within the upper hood 5 by a curved shell 18 welded to the inner edge of the individual sections making up the upper tube sheet 3. The lower end of the central region is sealed off from the outlet plenum formed within the bottom hood 6 by a cylindrical sleeve 19 welded to the radially inner edges of the sections making up the lower tube sheet 4. Within the cylindrical sleeve 19 is a cylindrically shaped support 20 which is secured to and extends downwardly from the bottom tube sheet 4. To relieve the center support 20 and to afford better alignment of the reaction apparatus, a pair of adjustable auxiliary supports 21 are secured to the lower end of the radially outer side wall of each of the modular units and extend downwardly from the lower end of the outer casing. As can be seen in FIGS. 1 and 4 the supports 21 bear against the lower surfaces of the lower conduit 10 encircling the casing 1.

As mentioned above, the special advantage of the present invention is that the reaction vessel is originally constructed as individual modular units at a production location, then the units are shipped and are assembled into the completed apparatus at a construction site. At the construction site, the radially inner and outer side walls of the modular units are welded together, as are the tube sheet sections to provide the completed tube bundle, tube sheets and radially inner and outer casings. Further, the hoods at the upper and lower ends of the apparatus and the supports are attached at the construction site.

In this assembly method, it is possible for the individual modular units to be tested for proper operability at the production location before they are shipped. As a consequence, the tubes must be tightly sealed to the tube sheet sections and the lateral sides of the units must also be tightly sealed so that pressure conditions within the unit can be established corresponding to the operating conditions to be used in the completed apparatus. The integrity of the tubes and their connections to the tube sheet sections can also be checked at the production location.

Another advantage of the present invention is the relatively low power required for circulating the heat transfer medium which flows over the tubes. If the central region within the apparatus is left free of tubes and the tubes ordinarily located in that location are arranged in one or several additional tube rows on the outside of the tube bundle, the diameter of the reaction vessel is only relatively slightly increased.

The increase in the outside diameter of the casing is much less than the diameter of the central portion of the casing which is left free of tubes. The radial flow length of the heat transfer medium increases and with it the power consumption per tube for the circulation for the medium also increases. It is particularly advantageous if the diameter of the portion of the casing containing the tubes relative to the central portion which is free of tubes does not exceed a ratio of 5:1.

The invention is independent of the number of individual modular units used; there can be more or fewer units than disclosed in the above embodiments.

While specific embodiments of the invention have been shown and described in detail to illustrate the application of the inventive principles, it will be understood that the invention may be embodied otherwise without departing from such principles.

I claim:

1. Method for the production of large catalytic reaction apparatus using a bundle of tubes extending longitudinally between a pair of spaced tube sheets comprising the steps of constructing the apparatus in a number of similarly shaped modular units at a production facility including dividing the tube sheets into correspondingly shaped sector-like sections with a pair of spaced sector-like sections forming the opposite ends of each modular unit, sealingly connecting the opposite ends of each tube in such modular unit to the sector-like sections of the tube sheets forming the opposite ends of the modular unit to provide a partial tube bundle having a transverse cross-sectional shape generally conforming to the shape of the sector-like sections of the tube sheets, sealingly enclosing the sides of the partial tube bundle extending between the sector-like sections of the tube sheets for providing a pressure tight enclosure about the outer surfaces of the tubes, shipping the enclosed partial tube bundle as separate units to the site at which the apparatus is to be constructed, connecting a heat transfer inlet and a heat transfer outlet to each modular unit between the sector-like sections of the tube sheets, and welding the sector-shaped sections of the tube sheets together for assembling the sealingly closed modular units into a complete tube bundle at the construction site.

2. Large catalytic reaction apparatus comprising a first tube sheet and a second tube sheet, said first and second tube sheets spaced apart and disposed in substantially parallel relation, each said tube sheet divided into an equal number of similarly shaped sector-like sections, a plurality of tubes extending between and connected to each pair of one sector-like section of said first tube sheet and one sector-like section of each said second tube sheet, said tubes sealingly connected to said sector-like sections of said tube sheets, each said sector-like section of said first and second tube sheets comprising a pair of angularly spaced radially extending edges, an inner edge extending circumferentially between the radially inner ends of said radially extending edges, and an outer edge extending circumferentially between the radially outer ends of said radially extending edges, a radially extending side wall connected to and extending between each corresponding radially extending edge of said pair of said sector-like sections joined by the plurality of said tubes, a radially inner circumferentially extending side wall connected to and extending between the inner edges of said pair of sector-like sections joined by the plurality of said tubes, and a radially outer circumferentially extending side wall connected to and extending between the outer edges of said pair of sector-like sections, the adjacent edges of said radially extending side walls, inner side wall and outer side wall sealingly connected together and said radially extending side walls, inner side wall and outer side wall sealingly connected to said sector-like sections of said first and second tube sheets for forming a sealingly enclosed pressure tight modular unit and a circumferentially extending heat transfer medium inlet conduit and a circumferentially extending heat transfer medium outlet conduit connected to the radially outer face of said circumferentially extending radially outer side wall in each said modular unit and means for interconnecting said inlet conduits on adjacent said modular units and for interconnecting said outlet conduits on adjacent said modular units, whereby each said modular unit provides a sealingly closed pressure tight unit capable of being tested at a production site at operating pressures before it is shipped to and assembled at a construction site for assembly with the completed apparatus.

3. Large catalytic reaction apparatus, as set forth in claim 2, wherein distance members are connected to and extend between adjacent said radially extending side walls of adjacent said enclosed modular units.

4. Large catalytic reaction apparatus, as set forth in claim 2, wherein said tubes in each said modular unit extend vertically, and vertically extending adjustable supports are located at and extending downwardly from said radially outer circumferentially extending side walls of each said modular unit.

5. Large catalytic reaction apparatus, as set forth in claim 2, wherein the diameter ratio of the diameter of said radially outer circumferentially extending side wall to the diameter of said radially inner circumferentially extending side wall is not greater than 5:1.

6. Large catalytic reaction apparatus, as set forth in claim 2, wherein adjacent said sector-like sections of said tube sheets in adjacent said modular units are welded together along the radially extending edges thereof, and the adjacent edges of said circumferentially extending radially outer side walls and the circumferentially extending radially inner side walls of adjacent said modular units are welded together along the edges thereof extending in the same direction as said tubes in said modular unit.

7. Large catalytic reaction apparatus, as set forth in claim 2, including means connected to said modular unit for forming a sealingly closed apparatus for flowing a fluid to be catalytically treated as it passes through said tubes and for circulating a heat transfer fluid over said tubes.

* * * * *